United States Patent
Chao

(10) Patent No.: US 7,548,280 B2
(45) Date of Patent: Jun. 16, 2009

(54) METHOD AND APPARATUS FOR Y/C SEPARATION

(75) Inventor: Po-Wei Chao, Taipei Hsien (TW)

(73) Assignee: Realtek Semiconductor Corp., HsinChu (TW)

( * ) Notice: Subject to any disclaimer, the term of this patent is extended or adjusted under 35 U.S.C. 154(b) by 781 days.

(21) Appl. No.: 11/306,109

(22) Filed: Dec. 16, 2005

(65) Prior Publication Data
US 2006/0197877 A1    Sep. 7, 2006

(30) Foreign Application Priority Data
Dec. 17, 2004    (TW)    .............................. 93139434 A

(51) Int. Cl.
*H04N 9/78* (2006.01)
(52) U.S. Cl. ...................... 348/669; 348/451
(58) Field of Classification Search ................ 348/663, 348/665, 667, 669, 670, 450–452; *H04N 9/77, H04N 9/78, 7/01, 11/20*
See application file for complete search history.

(56) References Cited

U.S. PATENT DOCUMENTS

| | | | | |
|---|---|---|---|---|
| 5,459,523 A | * | 10/1995 | Tanaka | 348/488 |
| 5,585,861 A | * | 12/1996 | Taniguchi et al. | 348/669 |
| 5,671,018 A | * | 9/1997 | Ohara et al. | 348/452 |

* cited by examiner

*Primary Examiner*—Sherrie Hsia
(74) *Attorney, Agent, or Firm*—Winston Hsu

(57) ABSTRACT

A method for separating luminance (Y) and chrominance (C) of composite signals is presented. The method includes the process of determining whether a target position of a target field has motion and whether the image of the target position meets a predetermined condition. If the target position of the target field has motion and the image of the target position meets the predetermined condition, an inter-field Y/C separation for video signals corresponding to the target position of the target field is performed.

37 Claims, 4 Drawing Sheets

METHOD AND APPARATUS FOR Y/C SEPARATION

BACKGROUND OF THE INVENTION

1. Field of the Invention

The present invention relates to image processing techniques, and more particularly, to methods and apparatus for Y/C separation.

2. Description of the Prior Art

When a television receives composite video signals, the luminance signals and the chrominance signals are necessarily separated from the composite video signal. This required procedure is also referred to as an Y/C separation operation.

Generally, the Y/C separation operation of the image signal corresponding to a target location of a current field is determined by a video decoder of the television according to the motion detecting results of the target location of the current field.

If the image of the target location has motion, then the conventional video decoder utilizes a 1D or 2D comb filter to perform an intra-field Y/C separation operation on the image signals of the target location. Conversely, if the image of the target location is determined as being still, a 3D comb filter is utilized to perform an inter-field Y/C separation operation on the image signals of the target location.

However, there is a need for methods and apparatus that can advantageously improve the Y/C separation performance at a lower cost.

SUMMARY OF THE INVENTION

It is therefore an objective of the claimed invention to provide methods and apparatuses for Y/C separation to solve the above-mentioned problems.

An exemplary embodiment of a Y/C separation method is disclosed, which comprises the process of generating a first motion value corresponding to a target position of a target field, performing a motion detection for the target position of the target field, generating at least one, while each of such second motion values correspond to a reference position regarding the target position, and determining whether an inter-field Y/C separation operation or an intra-field Y/C separation operation is to be performed on a video signal corresponding to the target position, which is determined according to the motion detection result and the first and second motion values.

An exemplary embodiment of another Y/C separation method is disclosed, which comprises the process of determining if a target position of a target field has motion, determining if an image corresponding to the target position meets a predetermined condition, and if the target position has motion and the image corresponding to the target position meets the predetermined condition, a 3D comb filtering operation to separate a luminance signal and a chrominance signal from a video signal corresponding to the target position is performed.

Thereto, an exemplary embodiment of a Y/C separating apparatus is disclosed, which comprises a motion detector for determining if a target position of a target field has motion, an image feature detector for determining if an image corresponding to the target position meets a predetermined condition, a decision unit for generating a control signal according to the determining results of the motion detector and the image feature detector, and a filter bank for performing a Y/C separation operation to separate a luminance signal and a chrominance signal from a video signal corresponding to the target position according to the control signal.

Preferably, the predetermined condition specifies that the target position correspond to a zooming image or a slow motion image.

Preferably, the predetermined condition is programmable.

Preferably, the inter-field Y/C separation operation is a 3D comb filtering operation.

These and other objectives of the present invention will no doubt become obvious to those of ordinary skill in the art after reading the following detailed description of the preferred embodiment that is illustrated in the various figures and drawings.

DETAILED DESCRIPTION

The present invention involves an innovative concept relating to the Y/C separation operation. Briefly, in accordance with the present invention, if an image corresponding to a specific pixel position has motion (i.e., this means that the image is not still), and the image corresponding to the specific pixel position has a predetermined image feature or meets a predetermined condition, then an inter-field Y/C separation operation is performed rather than an intra-field Y/C separation operation. The image quality obtained by applying the inter-field Y/C separation operation is superior to the image quality that would be obtained by applying the intra-field Y/C separation operation given the aforementioned image scenario.

Figure 1:
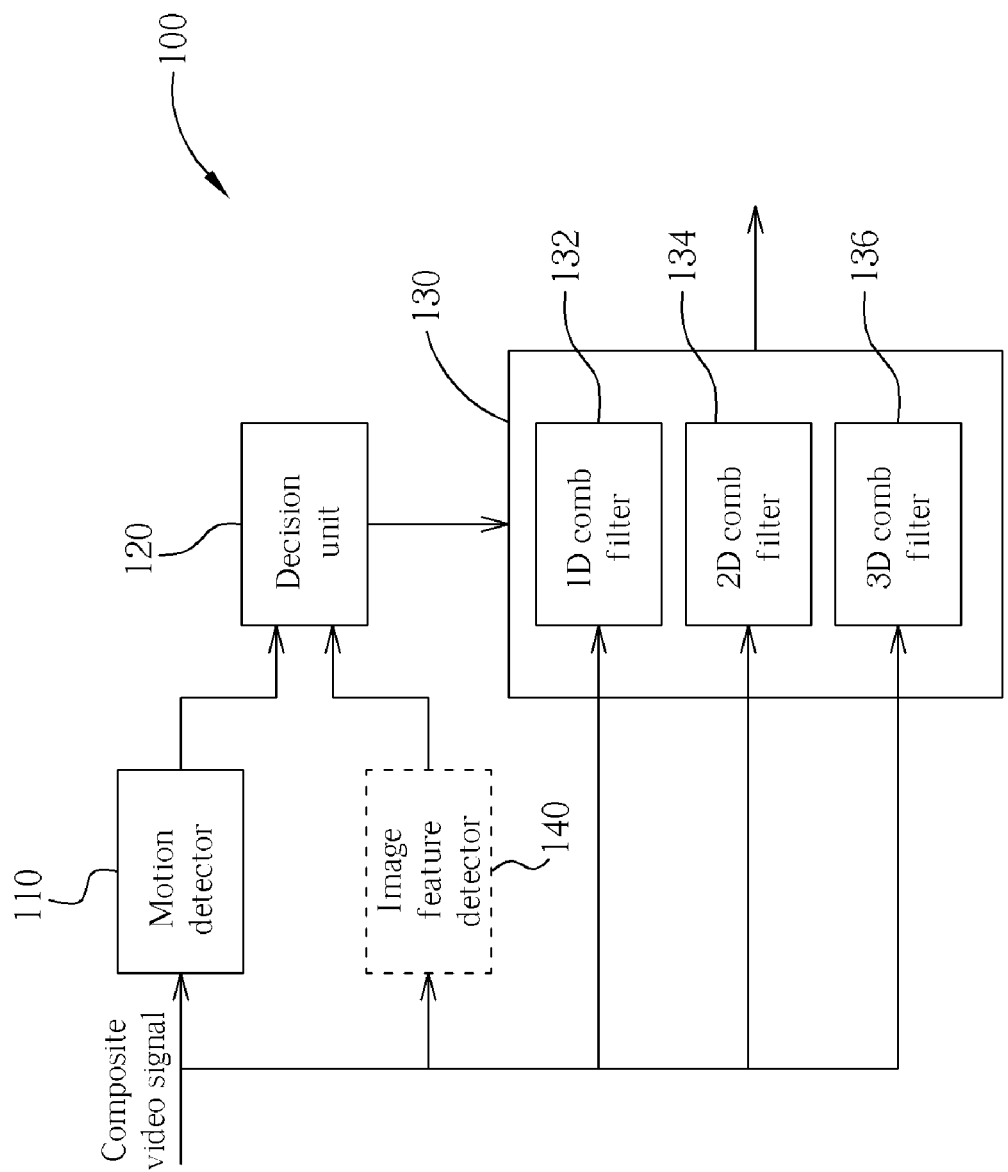
FIG. 1 is a functional block diagram of an Y/C separating apparatus of a video decoder according to one embodiment of the present invention.

Please refer to FIG. 1, which shows a functional block diagram of an Y/C separating apparatus 100 according to one embodiment of the present invention. The Y/C separating apparatus 100 comprises a motion detector 110, a decision unit 120, a filter bank 130, and an image feature detector 140. In one embodiment, the motion detector 110 performs motion detection operations on incoming composite video signals on a pixel-by-pixel basis. The image feature detector 140 determines if an image of the composite video signals satisfies a predetermined image feature. The decision unit 120 controls the filter bank 130 to perform a motion adaptive Y/C separation operation on the composite video signals according to the determining results of the motion detector 110 and the image feature detector 140. As shown in FIG. 1, the filter bank 130 of this embodiment comprises an intra-field Y/C separator (e.g., a 1D comb filter 132, a 2D comb filter 132, or any combination of the two) and an inter-field Y/C separator (e.g., a 3D comb filter 136). In one embodiment, the Y/C separating apparatus 100 is applied in a video decoder.

Figure 2:
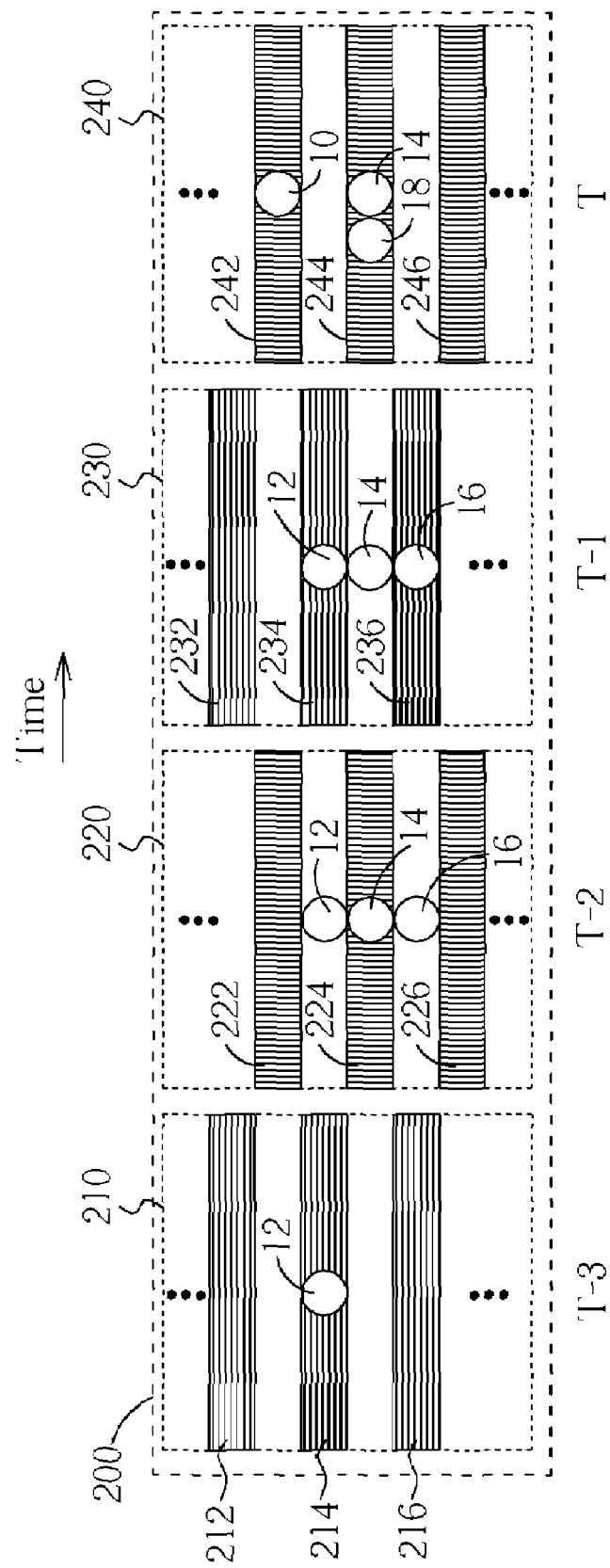
FIG. 2 is schematic diagram of video data in accordance with an exemplary embodiment of the present invention.

FIG. 2 shows a schematic diagram of video data 200 of the composite video signals received by the Y/C separating apparatus 100. The video data 200 comprises four consecutive fields 210, 220, 230 and 240 corresponding to time T-3, T-2, T-1 and T, respectively. In FIG. 2, scan lines 212, 222, 232 and 242 are respectively the $(N-1)^{th}$ scan lines of the fields 210, 220, 230 and 240; scan lines 214, 224, 234 and 244 are respectively the $N^{th}$ scan lines of the fields 210, 220, 230 and 240; and scan lines 216, 226, 236 and 246 are respectively the $(N+1)^{th}$ scan lines of the fields 210, 220, 230 and 240. Hereinafter, a target position 14 of a target field 240 functions as an example to illustrate the Y/C separation method of the present invention.

Figure 3:
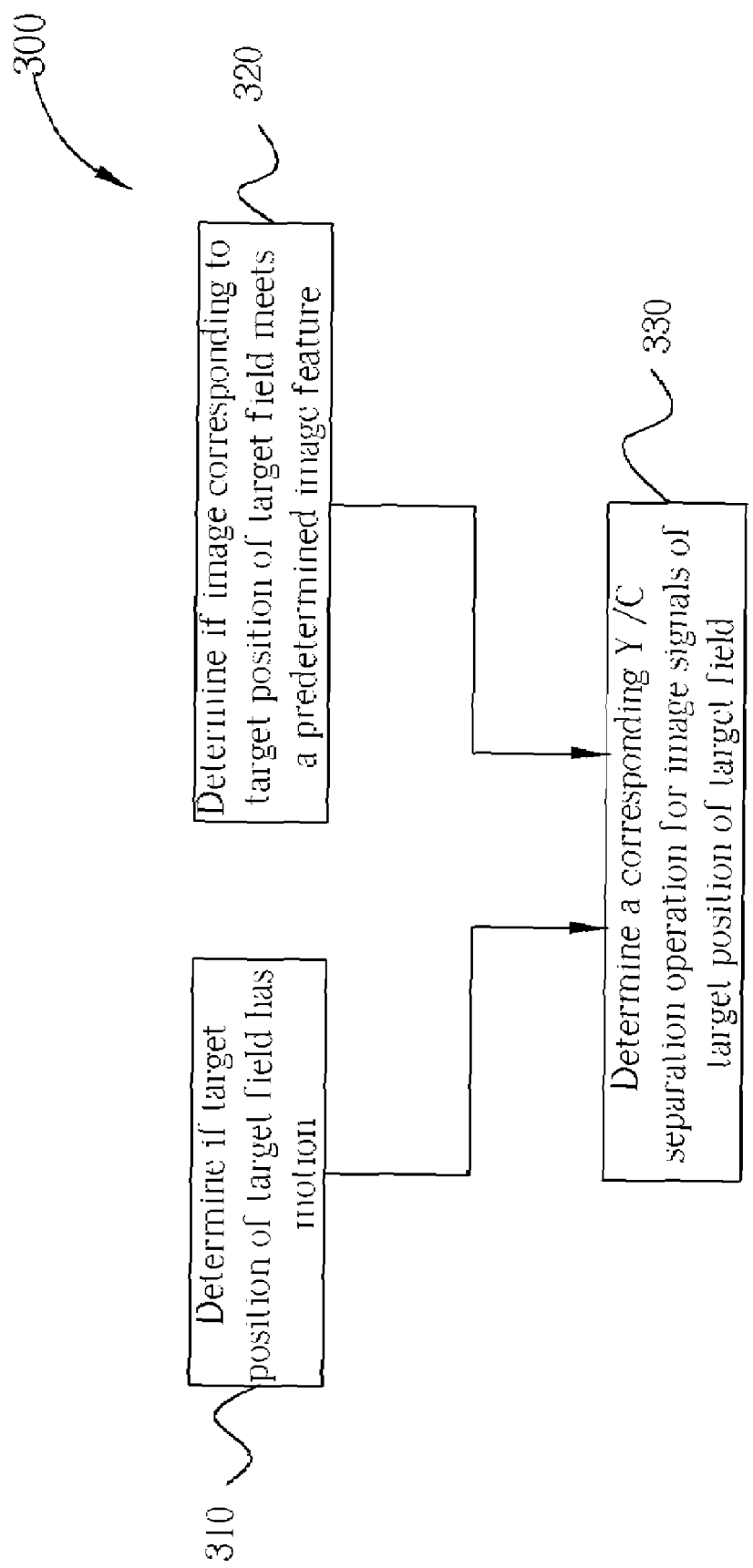
FIG. 3 is a flowchart illustrating an Y/C separation method according to a first embodiment of the present invention.

Please refer to FIG. 3, which shows a flowchart 300 illustrating an Y/C separation method according to a first embodiment of the present invention. The steps of the flowchart 300 are described below in detail.

In step 310, the motion detector 110 determines if the target position 14 of the target field 240 has motion. In practice, the motion detector 110 can be designed to determine motion between frames, or to determine motion between fields, or both. Hereinafter, motion between frames is referred to as inter-frame motion and motion between fields is referred to as inter-field motion. For example, the motion detector 110 can determine a degree of difference between the target field 240 and the preceding field 230 regarding the target position 14 to judge if an inter-field motion is present on the target position 14 of the target field 240. Additionally, the motion detector 110 can determine a degree of difference between the target field 240 and the field 220 regarding the target position 14 to judge if an inter-frame motion is present on the target position 14 of the target field 240.

In previously described motion detection operations, the motion detector 110 typically calculates a motion value corresponding to the target position 14 of the target field 240. The motion detector 110 then compares the motion value with a threshold value to determine if the target position 14 of the target field 240 has motion. The motion detection operations of the motion detector 110 are very well known and further details are therefore omitted here for brevity. As will be apparent to those of ordinary skill in the art, the motion detector 110 can be implemented with various techniques or means. These techniques and means may be currently known or awaiting future development.

In step 320, the image feature detector 140 determines if an image corresponding to the target position 14 of the target field 240 meets a predetermined image feature, such as a slow motion image or a zooming image. By experiments, an important conclusion is reached. That is, separating the luminance components and the chrominance components from image signals corresponding to a specific position with the 3D comb filtering operation will obtain superior image quality when the image of the specific position is part of a slow motion image or a zooming image. Applying the 1D comb filtering operation or the 2D comb filtering operation given the same scenario produces inferior image quality.

The slow motion image of this embodiment represents a dynamic image with a moving speed that is less than a threshold value. The moving speed can be measured in several ways. For example, moving speed can be measured based on the pixel distance of the dynamic image between two successive frames. Moving speed can also be measured based on a ratio of the moving distance of the dynamic image to the height or width of the picture within a predetermined period. In addition, the zooming image herein may be an image that is gradually enlarging or shrinking. The operations of detecting a slow motion image or a zooming image will be further described later.

In step 330, the decision unit 120 determines a corresponding Y/C separation operation for image signals of the target position 14 of the target field 240 according to the determining results of the motion detector 110 and the image feature detector 140. The decision unit 120 then controls the filter bank 130 to perform the determined Y/C separation operation on the image signals of the target position 14 of the target field 240. In this embodiment, the decision unit 120 controls the filter bank 130 to perform an inter-field Y/C separation operation on the image signals of the target position 14 of the target field 240 in either of two situations. The first situation is when the target position 14 of the target field 240 has no motion. The second situation is when the target position 14 of the target field 240 has motion but the image corresponding to the target position 14 has one of the above-mentioned image features.

On the other hand, if the target position 14 of the target field 240 has motion and the image corresponding to the target position 14 does not meet the above-mentioned image features, then the decision unit 120 controls the filter bank 130 to perform an intra-field Y/C separation operation on the image signals of the target position 14 of the target field 240 in step 330.

In practice, the comparison of the motion value and the threshold value can be made by the decision unit 120 in step 330 instead of the motion detector 110 in step 310.

Please note that the foregoing steps 310 and 320 can be performed in any order. In fact, the step 320 can be performed after assuring that the target position 14 of the target field 240 has motion, which is determined in step 310. In addition, please note that the motion detector 110 and the image feature detector 140 shown in FIG. 1 are merely employed to illustrate two functional blocks and can be implemented by distinct modules or a single circuit.

As mentioned, the slow motion image and zooming image are herein employed as examples of the predetermined image features. Generally, the moving speed of the zooming image is constant and the moving speed of the slow motion image is typically less than a certain threshold. These descriptions are intended to help illustrate rather than limit the present invention. In practice, other determining means may be employed to detect the image features based on the design choice. In one embodiment, the predetermined image features are programmable.

Figure 4:
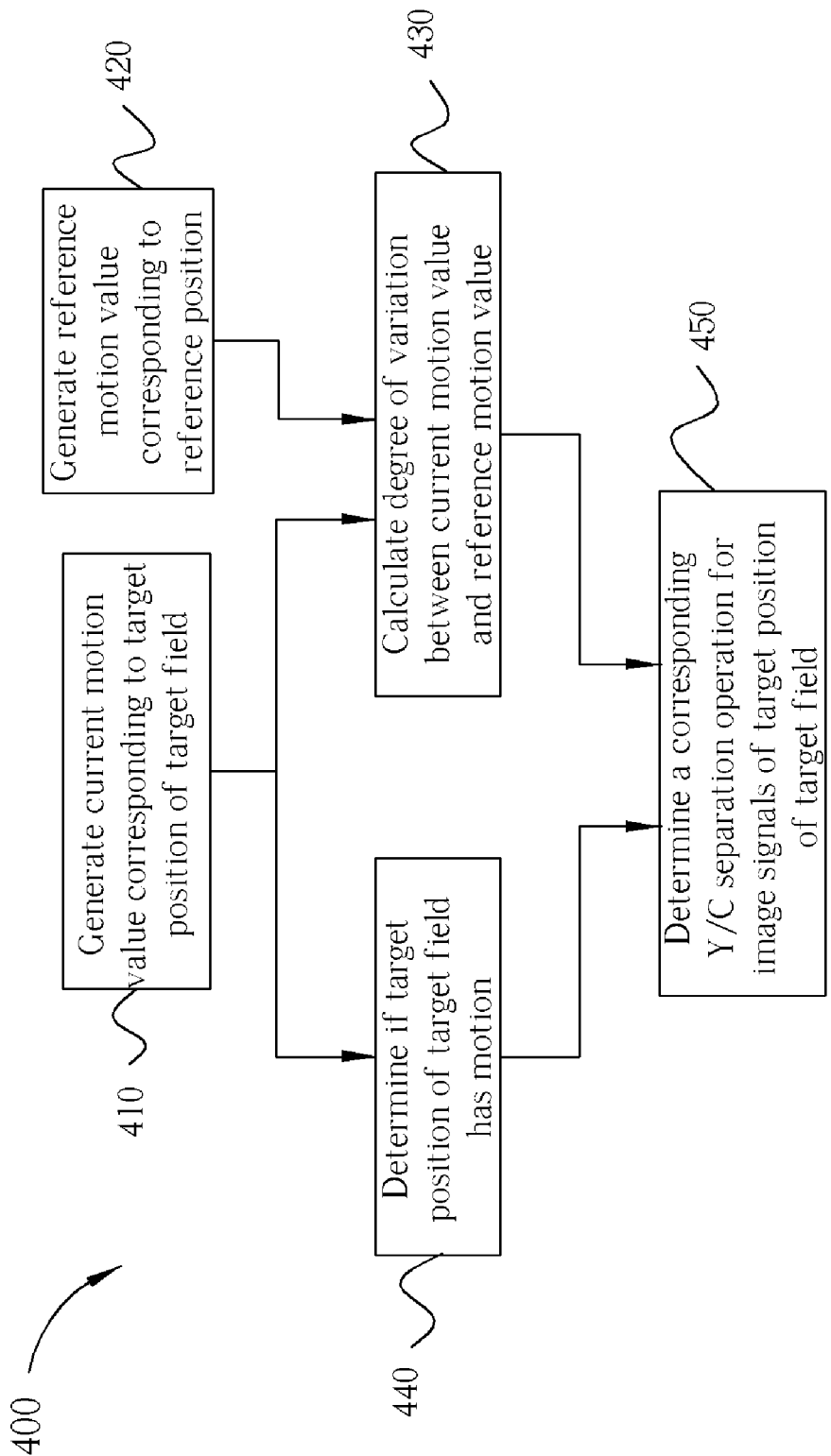
FIG. 4 is a flowchart illustrating an Y/C separation method according to a second embodiment of the present invention.

Please refer to FIG. 4, which shows a flowchart 400 illustrating an Y/C separation method according to a second embodiment of the present invention. In this embodiment, the function of the image feature detector 140 is realized by both the motion detector 110 and the decision unit 120. The steps of the flowchart 400 are described in greater detail below.

In step 410, a current motion value MVC corresponding to the target position 14 of the target field 240 is generated. In this embodiment, the operations of step 410 are substantially the same as the foregoing step 310. Therefore, rather than providing repetitive descriptions, these descriptions have been omitted.

In step 420, the motion detector 110 selects a pixel position nearby to the target position 14 as a reference position. Next, the motion detector 110 generates a reference motion value MVR corresponding to the reference position. The reference position may be located in the target field 240 or an adjacent field, such as the preceding field 230. In this embodiment, a pixel position 12 of the field 230 is selected as the reference position. Similarly, the motion detector 110 can generate the reference motion value MVR according to a degree of difference between the fields 230 and 220 regarding the reference position 12 or a degree of difference between the fields 230 and 210 regarding the reference position 12.

In a preferred embodiment, the Y/C separating apparatus 100 records in a buffer (not shown) some motion values generated from the motion detector 110 during the Y/C separation operations. This is to reduce the required computations for following fields. For example, during the Y/C separation operations for the target field 240 it is determined that a selected reference position is located in the preceding field 230 and that the current motion value of the reference position is stored in the buffer. The function of the buffer allows the current motion value of the reference position to simply be retrieved from the buffer to then function as the reference motion value of the reference position.

In practical implementations, the steps 410 and 420 can be performed in any order.

In step 430, the decision unit 120 calculates a degree of variation between the current motion value MVC and the reference motion value MVR to determine if the image of the target position 14 of the target field 240 meets the above-mentioned image features. In practice, the degree of variation between the current motion value MVC and the reference motion value MVR can be their change rate, standardized change rate, variance, coefficient of variation (CV value) or other representative values. Typically, if the image of the target position 14 of the target field 240 is a slow motion image or a zooming image then the degree of variation between the current motion value MVC and the reference motion value MVR will be located within a predetermined range. For example, when the image of the target position 14 of the target field 240 is a slow motion image then both the current motion value MVC and the reference motion value are greater than a threshold value corresponding to the still image. In addition, the difference between the two motion values is typically within a certain degree, i.e., the degree of variation between the current motion value MVC and the reference motion value MVR be within the predetermined range. However, when the image of the target position 14 of the target field 240 is a fast motion image, i.e., the moving speed of the image exceeds a threshold, the degree of variation between the current motion value MVC and the reference motion value MVR is typically greater than the upper limit of the predetermined range. In another aspect, the decision unit 120 of this embodiment determines if the image of the target position 14 meets the predetermined image features according to the image content or image characteristics of the target position 14 and the nearby reference position 12, such as the relationship between the two pixel positions regarding the movement, moving speed or acceleration.

In another embodiment, a weight factor is decided according to the degree of variation between the current motion value MVC and the reference motion value MVR and the predetermined range. Then, the result of the inter-field Y/C separation operation of the target position 14 and the result of the intra-field Y/C separation operation is weight blended based on the weight factor to obtain a new Y/C separation result for the target position 14 of the target field 240.

In step 440, the motion detector 110 determines if the target position 14 of the target field 240 has motion. The motion detector 100 can employ the same method as described in step 310 to perform step 440. Alternatively, the motion detector 110 can simply compare the current motion value generated in step 410 with a threshold value to determine if the target position 14 of the target field 240 has motion.

Additionally, instead of the motion detector 110, the decision unit 120 can determine if the target position 14 of the target field 240 has motion according to the degree of variation between the current motion value MVC and the reference motion value MVR. For example, if the degree of variation between the current motion value MVC and the reference motion value MVR is less than the lower limit of the predetermined range, then the target position 14 of the target field 240 can be accordingly determined as being still.

In step 450, the decision unit 120 determines a corresponding Y/C separation operation to be performed on the image signals of the target position 14 of the target field 240 and controls the filter bank 130 to perform the determined Y/C separation operation. Specifically, in this embodiment, if the target position 14 of the target field 240 is determined as being still by the motion detector 110 in step 440, then the decision unit 120 controls the filter bank 130 to manipulate the 3D comb filter 136 to perform an Y/C separation operation on the image signals of the target position 14 of the target field 240.

If the target position 14 of the target field 240 has motion, which is determined in step 440, and the degree of variation between the current motion value MVC and the reference motion value MVR obtained in step 430 is located within the predetermined range, then the decision unit 120 determines that the image of the target position 14 of the target field 240 meets the predetermined image features. In such a scenario, the decision unit 120 controls the filter bank 130 to manipulate the 3D comb filter 136 to perform the Y/C separation operation on the image signals of the target position 14 of the target field 240. In other words, the Y/C separation operation performed by the filter bank 130 is substantially the same as when the target position 14 of the target field 240 is determined as being still.

On the other hand, if the target position 14 of the target field 240 has motion, which is determined in step 440 and the degree of variation between the current motion value MVC and the reference motion value MVR obtained in step 430 exceeds the upper limit of the predetermined range, then the decision unit 120 determines that the image of the target position 14 of the target field 240 does not meet the predetermined image feature mentioned previously. Therefore, the decision unit 120 controls the filter bank 130 to perform an Y/C separation operation on the image signals corresponding to the target position 14 of the target field 240 utilizing image signals of some other positions of the target field 240. For example, the filter bank 130 can utilize the 1D comb filter 132 or the 2D comb filter 134 to execute the Y/C separation operation on the image signals corresponding to the target position 14 of the target field 240. In practice, the filter bank 130 can utilize at least two of the comb filters: 1D comb filter 132, the 2D comb filter 134 and the 3D comb filter 136 to respectively perform Y/C separation operations and then utilizes an operating unit (not shown) to weight blend the results obtained from those comb filters.

Note that the number of reference positions employed in step 420 and the distance between the target position 14 and each reference position are not limitations of the present invention.

In addition, when the target position 14 of the target field 240 has motion and the image thereof meets the predetermined image features mentioned previously, there is typically an edge approximating to or passing through the target position 14 of the target field 240. Generally, the moving speed of the edge is lower than a predetermined threshold. In practice, the decision unit 120 can determine if there is an edge with a moving speed lower than the predetermined threshold approximating to or passing through the target position 14 of the target field 240 according to the current motion value MVC obtained in step 410 and the reference motion value MVR obtained in step 420. Typically, if there is an edge with low moving speed passing through the target position 14 of the target field 240, the degree of variation between the current motion value MVC and the reference motion value MVR will be less than a specific threshold value.

In practical implementations, other means that are capable of determining if the image of the target position 14 of the target field 240 meets the predetermined image features are also included in the embodiments of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An Y/C separation method, comprising:
generating a first motion value corresponding to a target position of a target field;
performing a motion detection for the target position;
generating at least one second motion value, whereas each of the at least one second motion value corresponds to a reference position regarding the target position; and
determining whether an inter-field Y/C separation operation or an intra-field Y/C separation operation is to be performed on a video signal corresponding to the target position, which is determined according to the motion detection result and the first and second motion values.

2. The method of claim 1, wherein each of the target position and the reference position comprises at least one pixel.

3. The method of claim 1, wherein the step of generating the first motion value further comprises:
generating the first motion value according to a degree of difference between the target field and a preceding field regarding the target position.

4. The method of claim 1, wherein the step of generating the first motion value further comprises:
generating the first motion value according to a degree of difference between the target field and a field prior to a preceding field of the target field regarding the target position.

5. The method of claim 1, wherein the first motion value is compared with a threshold value to determine if the target position has motion.

6. The method of claim 1, wherein the reference position is located in the target field.

7. The method of claim 1, wherein the reference position is located in a field preceding the target field.

8. The method of claim 1, wherein some of the reference positions are located in the target field and some of the reference positions are located in a field preceding the target field.

9. The method of claim 1, further comprising:
calculating a degree of variation of the first and second motion values; and
if the degree of variation is within a predetermined range, the inter-field Y/C separation operation on a video signal corresponding to the target position is performed.

10. The method of claim 1, further comprising:
calculating a degree of variation of the first and second motion values; and
if the degree of variation is within a predetermined range, a 3D comb filtering operation on a video signal corresponding to the target position is performed.

11. The method of claim 10, wherein the target position corresponds to a slow motion image if the degree of variation is within the predetermined range.

12. The method of claim 10, wherein the target position corresponds to a zooming image if the degree of variation is within the predetermined range.

13. The method of claim 1, wherein the step of determining whether the inter-field Y/C separation operation or the intra-field Y/C separation operation is to be performed further comprises an additional reference of a moving speed, whereas the moving speed is determined by the first and second motion values.

14. The method of claim 1, wherein the step of generating the at least one second motion value further comprises:
generating a corresponding second motion value according to a degree of difference between fields regarding the reference position.

15. The method of claim 1, wherein the step of generating the at least one second motion value further comprises:
generating a corresponding second motion value according to a degree of difference between frames regarding the reference position.

16. The method of claim 1, further comprising:
calculating a degree of variation of the first and second motion values; and
if the degree of variation is greater than a predetermined threshold, the intra-field Y/C separation operation on the video signal corresponding to the target position is performed.

17. The method of claim 1, wherein the intra-field Y/C separation operation is a 1D comb filtering operation, a 2D comb filtering operation, or any combination of the two.

18. An Y/C separation method, comprising:
determining if a target position of a target field has motion;
determining if an image corresponding to the target position meets a predetermined condition; and
if the target position has motion and the image corresponding to the target position meets the predetermined condition, a 3D comb filtering operation to separate a luminance signal and a chrominance signal from a video signal corresponding to the target position is performed.

19. The method of claim 18, further comprising:
if the target position has motion but the image corresponding to the target position does not meet the predetermined condition, a 1D, a 2D, or any combination of the two comb filtering operations to separate a luminance signal and a chrominance signal from the video signal corresponding to the target position is performed.

20. The method of claim 18, wherein the predetermined condition specifies that an edge is approximating to the target position.

21. The method of claim 18, wherein the predetermined condition specifies that an edge is passing through the target position.

22. The method of claim 18, wherein the predetermined condition specifies that an edge, whose moving speed is slower than a predetermined value, is passing through the target position.

23. The method of claim 18, wherein the predetermined condition specifies that the target position correspond to a zooming image.

24. The method of claim 18, wherein the predetermined condition specifies that the target position correspond to a slow motion image.

25. The method of claim 18, wherein the step of determining if the target position has motion further comprises:
generating a first motion value corresponding to the target position; and
determining if the target position has motion according to the first motion value.

26. The method of claim 25, wherein the predetermined condition specifies that a degree of variation of the first motion value be within a predetermined range.

27. The method of claim 25, further comprising:
generating the first motion value according to a degree of difference between the target field and a preceding field regarding the target position.

28. The method of claim 25, further comprising:
generating the first motion value according to a degree of difference between the target field and a field prior to a preceding field of the target field regarding the target position.

29. The method of claim 25, further comprising:
generating at least one second motion value, whereas each of the at least one second motion value corresponds to a reference position comprising at least one pixel;
wherein the step of determining if the image corresponding to the target position meets a predetermined condition is executed according to the first and second motion values.

30. The method of claim 29, wherein the reference position is located in the target field.

31. The method of claim 29, wherein the reference position is located in a field preceding the target field.

32. The method of claim 29, wherein some of the reference positions are located in the target field and some of the reference positions are located in a field preceding the target field.

33. The method of claim 18, wherein the predetermined condition is programmable.

34. An Y/C separating apparatus, comprising:
a motion detector for determining if a target position of a target field has motion;
an image feature detector for determining if an image corresponding to the target position meets a predetermined condition;
a decision unit for generating a control signal according to the determining results of the motion detector and the image feature detector; and
a filter bank for performing an Y/C separation operation to separate a luminance signal and a chrominance signal from a video signal corresponding to the target position according to the control signal.

35. The Y/C separating apparatus of claim 34, wherein the predetermined condition specifies that the target position correspond to a zooming image.

36. The Y/C separating apparatus of claim 34, wherein the predetermined condition specifies that the target position correspond to a slow motion image.

37. The Y/C separating apparatus of claim 34, wherein the predetermined condition is programmable.

* * * * *